US012809173B2

(12) United States Patent
Schlaupitz et al.

(10) Patent No.: US 12,809,173 B2
(45) Date of Patent: Nov. 24, 2026

(54) WAVEGUIDE-BASED DISPLAYS WITH TINT LAYER

(71) Applicant: Apple Inc., Cupertino, CA (US)

(72) Inventors: Alexander D Schlaupitz, Longmont, CO (US); Edward J Wrzesniewski, San Jose, CA (US); Graham C Nelson, San Diego, CA (US); Hyungryul Choi, San Jose, CA (US); Kibyung Seong, Santa Clara, CA (US); Vikrant Bhakta, Santa Clara, CA (US); Xiaonan Wen, San Jose, CA (US); Zachary M Beiley, Oakland, CA (US)

(73) Assignee: Apple Inc., Cupertino, CA (US)

( * ) Notice: Subject to any disclaimer, the term of this patent is extended or adjusted under 35 U.S.C. 154(b) by 460 days.

(21) Appl. No.: 18/489,662

(22) Filed: Oct. 18, 2023

(65) Prior Publication Data

US 2024/0168296 A1 May 23, 2024

Related U.S. Application Data

(60) Provisional application No. 63/425,547, filed on Nov. 15, 2022.

(51) Int. Cl.
*G02B 27/01* (2006.01)
*G02F 1/161* (2006.01)

(52) U.S. Cl.
CPC ......... *G02B 27/0172* (2013.01); *G02F 1/161* (2013.01); *G02B 2027/0118* (2013.01)

(58) Field of Classification Search
None
See application file for complete search history.

(56) References Cited

U.S. PATENT DOCUMENTS

| | | | |
|---|---|---|---|
| 9,626,936 | B2 | 4/2017 | Bell |
| 11,243,400 | B1 | 2/2022 | Keith |
| 2011/0116152 | A1 | 5/2011 | Guigan et al. |
| 2016/0266460 | A1 | 9/2016 | Kloeppner et al. |
| 2017/0108697 | A1 | 4/2017 | El-Ghoroury et al. |

(Continued)

FOREIGN PATENT DOCUMENTS

| | | | |
|---|---|---|---|
| CN | 110262039 | A | 9/2019 |
| CN | 113156652 | A | 7/2021 |

(Continued)

*Primary Examiner* — Chris H Chu

(74) *Attorney, Agent, or Firm* — Treyz Law Group, P.C.; Michael H. Lyons; Jinie M. Guihan

(57) ABSTRACT

An electronic device may include a first bias lens that transmits world light to an output coupler on a waveguide. The output coupler may transmit the world light while coupling image light out of the waveguide. A second bias lens may transmit the world light and the image light to an eye box. A tint layer may transmit the world light towards the output coupler. The tint layer may be planar and layered onto a planar surface of the first bias lens or another lens, may be separated from the first bias lens by an air gap, may be non-parallel relative to the waveguide, and/or may be curved and separated from the first bias lens and the wave-guide by air gaps. When planar, the tint layer may be provided with spacers between substrates or between the tint layer and the waveguide to maximize parallelism.

24 Claims, 9 Drawing Sheets

(56) References Cited

U.S. PATENT DOCUMENTS

| | | | |
|---|---|---|---|
| 2020/0049996 A1 | 2/2020 | Yan et al. | |
| 2020/0301239 A1 | 9/2020 | Akkaya et al. | |
| 2022/0011496 A1* | 1/2022 | Bhakta | G02B 6/34 |
| 2022/0244552 A1 | 8/2022 | Le et al. | |
| 2022/0342235 A1 | 10/2022 | Bouchier et al. | |
| 2022/0413291 A1 | 12/2022 | Price et al. | |
| 2023/0096399 A1 | 3/2023 | Ha et al. | |
| 2023/0204958 A1 | 6/2023 | Fliszar et al. | |

FOREIGN PATENT DOCUMENTS

| | | | | |
|---|---|---|---|---|
| CN | 115244431 B | * | 10/2024 | G02B 26/004 |
| ES | 2668994 T3 | * | 5/2018 | A61F 2/16 |
| WO | 2021055230 A1 | | 3/2021 | |
| WO | 2021146474 A1 | | 7/2021 | |
| WO | 2022020262 A1 | | 1/2022 | |
| WO | 2023049065 A1 | | 3/2023 | |
| WO | WO-2023034219 A1 | * | 3/2023 | G02B 27/0172 |
| WO | 2023137240 A2 | | 7/2023 | |

* cited by examiner

WAVEGUIDE-BASED DISPLAYS WITH TINT LAYER

This application claims the benefit of U.S. Provisional Patent Application No. 63/425,547, filed Nov. 15, 2022, which is hereby incorporated by reference herein in its entirety.

BACKGROUND

This disclosure relates to optical systems such as optical systems in electronic devices having displays.

Electronic devices can include displays that provide images near the eyes of a user. Such electronic devices often include virtual or augmented reality headsets with displays having optical elements that allow users to view the displays. If care is not taken, components used to display images can be bulky and might not exhibit desired levels of optical performance.

SUMMARY

An electronic device may have a display system for providing image light to eye boxes. The display system may include waveguides. Projectors may generate image light containing a virtual object. Input couplers may couple the image light into the waveguides. Output couplers may couple the image light out of the waveguides and towards the eye boxes. The eye boxes may have a field of view (FOV). The output couplers may also pass world light from external objects to the eye boxes within the FOV.

A first bias lens may transmit world light to the output coupler on a corresponding one of the waveguides. The output coupler may transmit the world light. A second bias lens may transmit the world light and the image light to the eye box. An electrically adjustable tint layer may transmit the world light towards the output coupler. The tint layer may be planar and may be layered onto a planar surface of the first bias lens and/or onto a planar surface of an additional lens having a curvature. If desired, the tint layer may be separated from the first bias lens by an air gap. If desired, the tint layer may be tilted at a non-parallel angle with respect to a surface of the waveguide.

If desired, the tint layer may be curved and may be separated from both the first bias lens and the waveguide by air gaps. The interfaces of within the tint layer may be selected to minimize reflectivity to the image light. When the tint layer is planar, the tint layer may have one or more characteristics that enhance its planarity and parallelism with the waveguide, including increased substrate thicknesses, a set of spacers between the substrates of the tint layer, and/or spacers between the tint layer and the waveguide. If desired, one or more of the air gaps may be filled with low-index materials.

DETAILED DESCRIPTION

Figure 1:
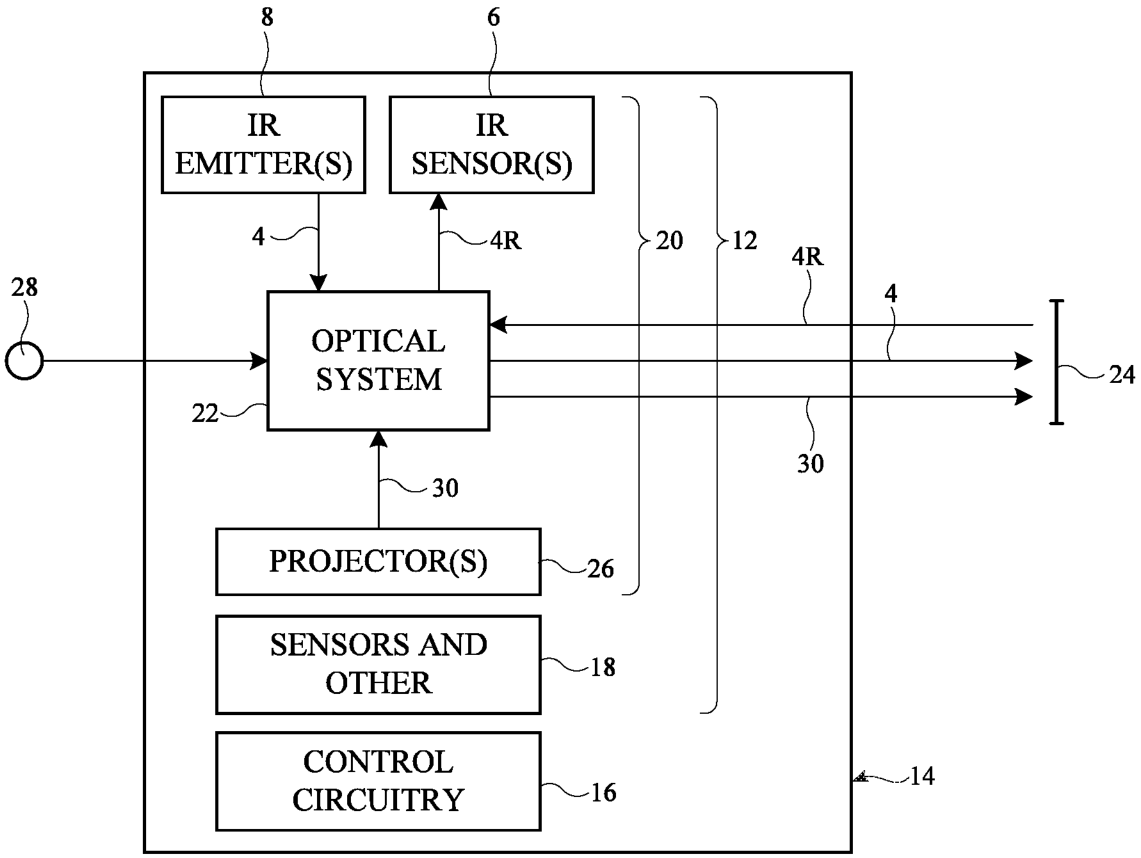
FIG. 1 is a diagram of an illustrative system having a display in accordance with some embodiments.

System 10 of FIG. 1 may be an electronic device such as a head-mounted device having one or more displays. The displays in system 10 may include near-eye displays 20 mounted within support structure such as housing 14. Housing 14 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display projectors such as projectors 26 (sometimes referred to herein as display modules 26) and one or more optical systems such as optical systems 22. Projectors 26 may be mounted in a support structure such as housing 14. Each projector 26 may emit image light 30 that is redirected towards a user's eyes at eye box 24 using an associated one of optical systems 22. Image light 30 may be, for example, visible light (e.g., including wavelengths from 400-700 nm) that contains and/or represents something viewable such as a scene or object (e.g., as modulated onto the image light using the image data provided by the control circuitry to the display module).

The operation of system 10 may be controlled using control circuitry 16. Control circuitry 16 may include storage and processing circuitry for controlling the operation of system 10. Control circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may include one or more processors (e.g., microprocessors, microcontrollers, digital signal processors, baseband processors, etc.), power management units, audio chips, graphics processing units, application specific integrated circuits, and other integrated circuits. Software code may be stored on storage in control circuitry 16 and run on processing circuitry in control circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Projectors 26 may include liquid crystal displays, organic light-emitting diode displays, laser-based displays, or displays of other types. Projectors 26 may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light 30, etc.

Optical systems 22 may form lenses that allow a viewer (see, e.g., a viewer's eyes at eye box 24) to view images on display(s) 20. There may be two optical systems 22 (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 22 may be selected so that any gap present between the displays will not be visible to a user (e.g., so that the images of the left and right displays overlap or merge seamlessly).

If desired, optical system 22 may contain components (e.g., an optical combiner formed from reflective components, diffractive components, a waveguide, a direct view optical combiner, etc.) to allow real-world light (sometimes referred to as world light) from real-world (external) objects such as real-world (external) object 28 to be combined optically with virtual (computer-generated) images such as virtual images in image light 30. In this type of system, which is sometimes referred to as an augmented reality system, a user of system 10 may view both real-world content (e.g., world light from object 28) and computer-generated content that is overlaid on top of the real-world content. Camera-based augmented reality systems may also be used in device 10 (e.g., in an arrangement in which a camera captures real-world images of object 28 and this content is digitally merged with virtual content at optical system 22).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

If desired, system 10 may include an optical sensor. The optical sensor may be used to gather optical sensor data associated with a user's eyes at eye box 24. The optical sensor may, for example, be a gaze tracking sensor that gathers optical sensor data such as gaze image data (gaze tracking image data or gaze tracking sensor data) from a user's eye at eye box 24. Control circuitry 16 may process the optical sensor data to identify and track the direction of the user's gaze in real time. Control circuitry 16 may perform any desired operations based on the tracked direction of the user's gaze over time.

As shown in FIG. 1, the optical sensor (gaze tracking sensor) may include one or more optical emitters such as infrared emitter(s) 8 and one or more optical receivers (sensors) such as infrared sensor(s) 6 (sometimes referred to herein as optical sensor 6). Infrared emitter(s) 8 may include one or more light sources that emit sensing light such as light 4. Light 4 may be used for performing optical sensing on/at eye box 24 (e.g., gaze tracking) rather than conveying pixels of image data such as in image light 30. Light 4 may include infrared light. The infrared light may be at infrared (IR) wavelengths and/or near-infrared (NIR) wavelengths (e.g., any desired wavelengths from around 700 nm to around 15 microns). Light 4 may additionally or alternatively include wavelengths less than 700 nm if desired. Light 4 may sometimes be referred to herein as sensor light 4.

Infrared emitter(s) 8 may direct light 4 towards optical system 22. Optical system 22 may direct the light 4 emitted by infrared emitter(s) 8 towards eye box 24. Light 4 may reflect off portions (regions) of the user's eye at eye box 24 as reflected light 4R (sometimes referred to herein as reflected sensor light 4R, which is a reflected version of light 4). Optical system 22 may receive reflected light 4R and may direct reflected light 4R towards infrared sensor(s) 6. Infrared sensor(s) 6 may receive reflected light 4R from optical system 22 and may gather (e.g., generate, measure, sense, produce, etc.) optical sensor data in response to the received reflected light 4R. Infrared sensor(s) 6 may include an image sensor or camera (e.g., an infrared image sensor or camera), for example. Infrared sensor(s) 6 may include, for example, one or more image sensor pixels (e.g., arrays of image sensor pixels). The optical sensor data may include image sensor data (e.g., image data, infrared image data, one or more images, etc.). Infrared sensor(s) 6 may pass the optical sensor data to control circuitry 16 for further processing. Infrared sensor(s) 6 and infrared emitter(s) 8 may be omitted if desired.

Figure 2:
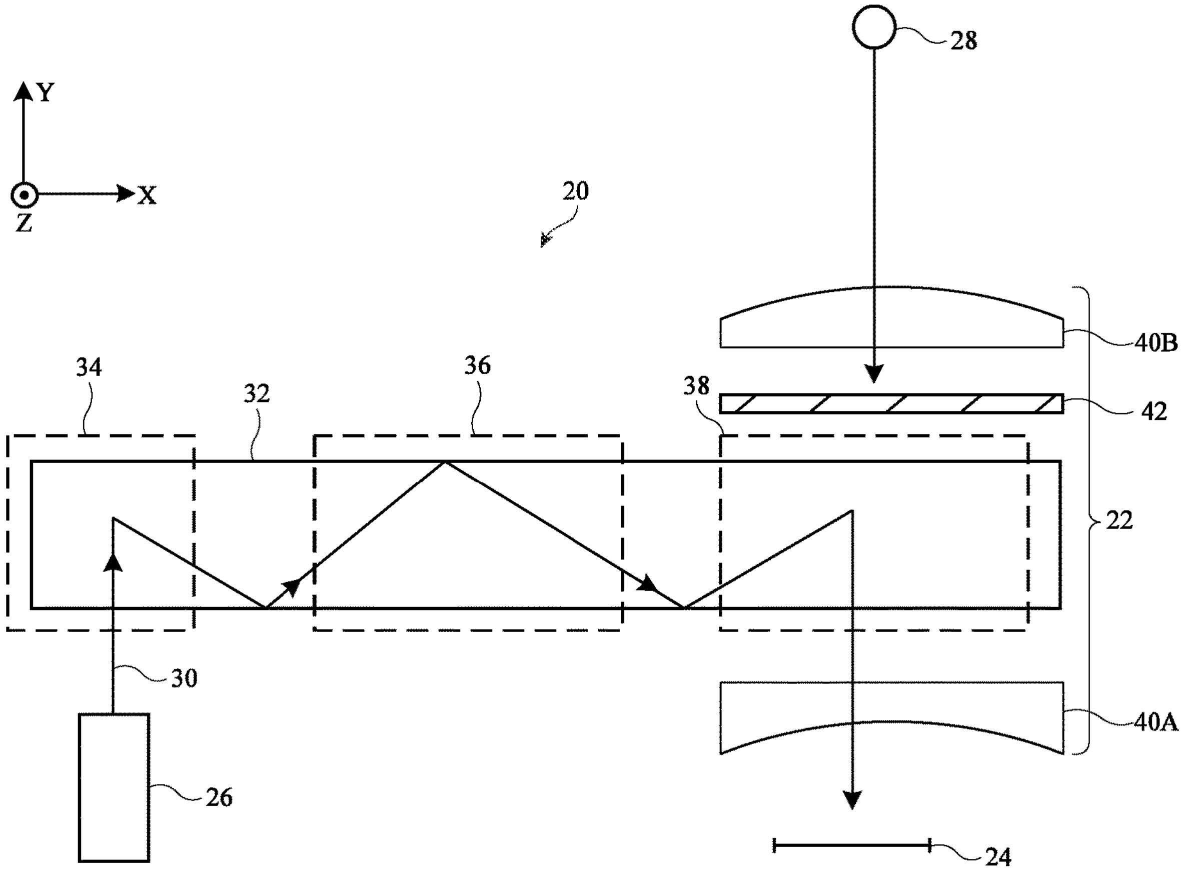
FIG. 2 is a top view of an illustrative optical system for a display having a waveguide with a lens and a tint layer for providing a virtual object overlaid with a real-world object to an eye box in accordance with some embodiments.

FIG. 2 is a top view of an illustrative display 20 that may be used in system 10 of FIG. 1. As shown in FIG. 2, display 20 may include a projector such as projector 26 and an optical system such as optical system 22. Optical system 22 may include optical elements such as one or more waveguides 32. Waveguide 32 may include one or more stacked substrates (e.g., stacked planar and/or curved layers sometimes referred to herein as waveguide substrates) of optically transparent material such as plastic, polymer, glass, etc.

If desired, waveguide 32 may also include one or more layers of holographic recording media (sometimes referred to herein as holographic media, grating media, or diffraction grating media) on which one or more diffractive gratings are recorded (e.g., holographic phase gratings, sometimes referred to herein as holograms, surface relief gratings, etc.). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating medium may include photopolymers, gelatin such as dichromated gelatin, silver halides, holographic polymer dispersed liquid crystal, or other suitable holographic media.

Diffractive gratings on waveguide 32 may include holographic phase gratings such as volume holograms or thin-film holograms, meta-gratings, or any other desired diffractive grating structures. The diffractive gratings on waveguide 32 may also include surface relief gratings (SRGs) formed on one or more surfaces of the substrates in waveguide 32 (e.g., as modulations in thickness of a SRG medium layer). The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 32 if desired.

As shown in FIG. 2, projector 26 may generate (e.g., produce and emit) image light 30 associated with image content to be displayed to eye box 24 (e.g., image light 30 may convey a series of image frames for display at eye box 24). Image light 30 may be collimated using a collimating lens in projector 26 if desired. Optical system 22 may be used to present image light 30 output from projector 26 to eye box 24. If desired, projector 26 may be mounted within support structure 14 of FIG. 1 while optical system 22 may be mounted between portions of support structure 14 (e.g., to form a lens that aligns with eye box 24). Other mounting arrangements may be used, if desired.

Optical system 22 may include one or more optical couplers (e.g., light redirecting elements) such as input coupler 34, cross-coupler 36, and output coupler 38. In the example of FIG. 2, input coupler 34, cross-coupler 36, and output coupler 38 are formed at or on waveguide 32. Input coupler 34, cross-coupler 36, and/or output coupler 38 may be completely embedded within the substrate layers of waveguide 32, may be partially embedded within the substrate layers of waveguide 32, may be mounted to waveguide 32 (e.g., mounted to an exterior surface of waveguide 32), etc.

Waveguide 32 may guide image light 30 down its length via total internal reflection. Input coupler 34 may be configured to couple image light 30 from projector 26 into waveguide 32 (e.g., within a total-internal reflection (TIR) range of the waveguide within which light propagates down the waveguide via TIR), whereas output coupler 38 may be configured to couple image light 30 from within waveguide 32 (e.g., propagating within the TIR range) to the exterior of waveguide 32 and towards eye box 24 (e.g., at angles outside of the TIR range). Input coupler 34 may include an input coupling prism, an edge or face of waveguide 32, a lens, a steering mirror or liquid crystal steering element, diffractive grating structures (e.g., volume holograms, SRGs, etc.), partially reflective structures (e.g., louvered mirrors), or any other desired input coupling elements.

As an example, projector 26 may emit image light 30 in direction +Y towards optical system 22. When image light 30 strikes input coupler 34, input coupler 34 may redirect image light 30 so that the light propagates within waveguide 32 via total internal reflection towards output coupler 38 (e.g., in direction +X within the TIR range of waveguide 32). When image light 30 strikes output coupler 38, output coupler 38 may redirect image light 30 out of waveguide 32 towards eye box 24 (e.g., back along the Y-axis). In implementations where cross-coupler 36 is formed on waveguide 32, cross-coupler 36 may redirect image light 30 in one or more directions as it propagates down the length of waveguide 32 (e.g., towards output coupler 38 from a direction of propagation as coupled into the waveguide by the input coupler). In redirecting image light 30, cross-coupler 36 may also perform pupil expansion on image light 30 in one or more directions. In expanding pupils of the image light, cross-coupler 36 may, for example, help to reduce the vertical size of waveguide 32 (e.g., in the Z direction) relative to implementations where cross-coupler 36 is omitted. Cross-coupler 36 may therefore sometimes also be referred to herein as pupil expander 36 or optical expander 36. If desired, output coupler 38 may also expand image light 30 upon coupling the image light out of waveguide 32.

Input coupler 34, cross-coupler 36, and/or output coupler 38 may be based on reflective and refractive optics or may be based on diffractive (e.g., holographic) optics. In arrangements where couplers 34, 36, and 38 are formed from reflective and refractive optics, couplers 34, 36, and 38 may include one or more reflectors (e.g., an array of micromirrors, partial mirrors, louvered mirrors, or other reflectors). In arrangements where couplers 34, 36, and 38 are based on diffractive optics, couplers 34, 36, and 38 may include diffractive gratings (e.g., volume holograms, surface relief gratings, etc.).

The example of FIG. 2 is merely illustrative. Optical system 22 may include multiple waveguides that are laterally and/or vertically stacked with respect to each other. Each waveguide may include one, two, all, or none of couplers 34, 36, and 38. Waveguide 32 may be at least partially curved or bent if desired. One or more of couplers 34, 36, and 38 may be omitted. If desired, optical system 22 may include a single optical coupler that performs the operations of both cross-coupler 36 and output coupler 38 (sometimes referred to herein as an interleaved coupler, a diamond coupler, or a diamond expander) or cross-coupler 36 may be separate from output coupler 38.

The operation of optical system 22 on image light 30 is shown in FIG. 2. Optical system 22 may also direct light 4 from infrared emitter(s) 8 towards eye box 24 and may direct reflected light 4R from eye box 24 towards infrared sensor(s) 6 (FIG. 1). In addition, output coupler 38 may form an optical combiner for image light 30 and world light from real-world objects such as real-world object 28. As shown in FIG. 2, world light from real-world object 28 may pass through output coupler 38, which transmits the world light (e.g., without diffracting the world light) to eye box 24.

Image light 30 may include images of virtual objects, sometimes referred to herein as virtual object images or simply as virtual objects. Projector 26 may receive image data that includes the virtual object images (e.g., pixels of image data at different pixel locations that form the virtual object images). Output coupler 38 may serve to overlay the virtual object images with world light from real-world object 28 within the field of view (FOV) of eye box 24. The control circuitry for system 10 may provide image data to projector 26 that places the virtual object images at desired locations within the FOV at eye box 24 (e.g., such that the virtual object images are overlaid with desired real-world objects in the scene/environment in front of system 10.)

Optical system 22 may include one or more lenses 40 that overlap output coupler 38. For example, optical system 22 may include at least a first lens 40A and a second lens 40B. Lens 40B may be interposed between waveguide 32 and real-world object 28. Lens 40A may be interposed between waveguide 32 and eye box 24. Lenses 40 are transparent and allow world light from real-world object 28 to pass to eye box 24 for viewing by the user. At the same time, the user can view virtual object images directed out of waveguide 32 and through lens 40A to eye box 24. Lenses 40A and 40B may sometimes also be referred to herein as lens elements.

The strength (sometimes referred to as the optical power, power, or diopter) of lens 40A can be selected to place virtual object images in image light 30 at a desired image distance (depth) from eye box 24 (sometimes referred to herein as a virtual object distance, virtual object image distance, virtual image distance (VID), virtual object depth, virtual image depth, or image depth). For example, it may be desirable to place virtual objects (virtual object images) such as text, icons, moving images, characters, effects, or other content or features at a certain virtual image distance (e.g., to integrate the virtual object image within, onto, into, or around the real-world objects in front of system 10). The placement of the virtual object at that distance can be accomplished by appropriate selection of the strength of lens 40A. Lens 40A may be a negative lens for users whose eyes do not have refraction errors. The strength (larger net negative power) of lens 40A can therefore be selected to adjust the distance (depth) of the virtual object. Lens 40A may therefore sometimes be referred to herein as bias lens 40A or bias-(B-) lens 40A.

If desired, lens 40B may have a complementary power value (e.g., a positive power with a magnitude that matches the magnitude of the negative power of lens 40A). Lens 40B may therefore sometimes be referred to herein as bias+ (B+) lens 40B, complementary lens 40B, or compensation lens 40B. For example, if lens 40A has a power of −2.0 diopter, lens 40B may have an equal and opposite power of +2.0 diopter (as an example). In this type of arrangement, the positive power of lens 40B cancels the negative power of lens 40A. As a result, the overall power of lenses 40A and 40B taken together will be 0 diopter. This allows a viewer to view real-world objects such as real-world object 28 without optical influence from lenses 40A and 40B. For example, a real-world object 28 located far away from system 10 (effectively at infinity), may be viewed as if lenses 40A and 40B were not present.

For a user with satisfactory uncorrected vision, this type of complementary lens arrangement therefore allows virtual objects to be placed in close proximity to the user (e.g., at a virtual image distance of 0.5-5 m, at least 0.1 m, at least 1 m, at least 2 m, less than 20 m, less than 10 m, less than 5 m, or other suitable near-to-midrange distance from device 10 while simultaneously allowing the user to view real world objects without modification by the optical components of the optical system). For example, a real-world object located at a distance of 2 m from device 10 (e.g., a real-world object being labeled by a virtual text label at a virtual image distance of 2 m) will optically appear to be located 2 m from device 10. This is merely illustrative and, if desired, lenses 40A and 40B need not be complementary lenses (e.g., lenses 40A and 40B may have any desired optical powers).

In addition, some users may require vision correction. Vision correction may be provided using tunable lenses, fixed (e.g., removable) lenses (sometimes referred to as supplemental lenses, vision correction lenses, removable lenses, or clip-on lenses), and/or by adjusting the optical power of lens 40A and/or lens 40B to implement the desired vision correction. In general, the vision correction imparted to the lens(es) may include corrections for ametropia (eyes with refractive errors) such as lenses to correct for nearsightedness (myopia), corrections for farsightedness (hyperopia), corrections for astigmatism, corrections for skewed vision, corrections to help accommodate age-related reductions in the range of accommodation exhibited by the eyes (sometimes referred to as presbyopia), and/or other vision disorders.

Lenses 40A and 40B may be provided with any desired optical powers and any desired shapes (e.g., may be plano-convex lenses, plano-concave lenses, plano-freeform lenses, freeform-convex lenses, freeform-concave lenses, convex-concave lenses, freeform-freeform lenses, etc.). Implementations in which the optical power(s) of lenses 40A and/or 40B are fixed (e.g., upon manufacture) are described herein as an example. If desired, one or both of lenses 40A and/or 40B may be electrically adjustable to impart different optical powers or power profiles over time (e.g., lenses 40A and/or 40B may be adjustable/tunable liquid crystal lenses).

In some operating conditions, such as when system 10 is operated outdoors, in rooms with bright lighting, or in other environments having relatively high light levels, world light from real-world objects 28 can overpower or wash out virtual objects presented to eye box 24 in image light 30, thereby limiting the contrast and visibility of the virtual objects when viewed at eye box 24. To reduce the brightness of the world light and maximize the contrast of the images (virtual objects) in image light 30 when viewed at eye box 24, optical system 22 may include a light-absorbing layer such as tint layer 42. Tint layer 42 may be disposed within the optical path between real-world objects 28 and output coupler 38. The world light from real-world objects 28 may pass through tint layer 42 prior to reaching eye box 24 (e.g., tint layer 42 may transmit the world light without transmitting image light 30). Tint layer 42 may absorb some of the real-world light, thereby reducing its brightness and increasing the contrast of virtual objects in image light 30 at eye box 24. If desired, the tint layer may also function to absorb real-world light, even when the virtual image is turned off, performing a function like switchable sunglasses.

Tint layer 42 may be a fixed tint layer or may be a dynamically adjustable tint layer. When implemented as a fixed tint layer, tint layer 42 has a fixed transmission profile that absorbs the same amount of incident world light over time. Fixed tint layers may be formed from a polymer film containing dye and/or pigment (as an example). When implemented as a dynamically (electrically) adjustable tint layer, tint layer 42 has a dynamically (electrically) adjustable transmission profile. In these implementations, tint layer 42 may be controlled by control signals from control circuitry 16. Implementations in which tint layer 42 is a dynamically adjustable tint layer are described herein as an example. However, in general, tint layer 42 as described herein may be replaced with a fixed tint layer.

Electrically adjustable tint layers (sometimes referred to as electrically adjustable light modulators or electrically adjustable light modulator layers) may be formed from an organic or inorganic electrochromic light modulator layer or a guest-host liquid crystal light modulator layer. When implemented using organic electrochromic tint materials, the active tint materials in the tint layer may be formed from one or more polymer layers which change their absorption upon being oxidized or reduced by charge from adjacent electrodes, or the active tint materials in the tint layer may be made from one or more species of organic small molecules, which diffuse in a liquid or gel medium and change their absorption upon being oxidized or reduced by charge from adjacent electrodes. When implemented using inorganic electrochromic tint materials, the active tint materials may be formed from one or more metal oxides, which change their absorption upon being oxidized or reduced by charge from adjacent electrodes, and may include counterions. During operation of system 10, the electrically adjustable tint layer may be dynamically placed in a high transmission mode (sometimes referred to herein as a clear state) when it is desired to enhance the visibility of real-world objects or in a lower transmission mode (sometimes referred to herein as a dark state) when it is desired to reduce scene brightness and thereby help enhance the viewability of image light from projector 26 (e.g., to allow virtual objects such as virtual objects in image light 30 to be viewed without being overwhelmed by bright environmental light). If desired, tint layer 42 may also be controlled to exhibit intermediate levels of transmission and/or transmission levels that vary across the field of view of eye box 24.

Tint layer 42 may be planar (e.g., having a lateral surface that lies in a flat plane) or may be curved (e.g., having a lateral surface that is curved and non-planar). Tint layer 42 may be disposed at any desired location within optical system 22 between real-world objects 28 (e.g., the scene in front of system 10) and output coupler 38 on waveguide 32.

Figure 3:
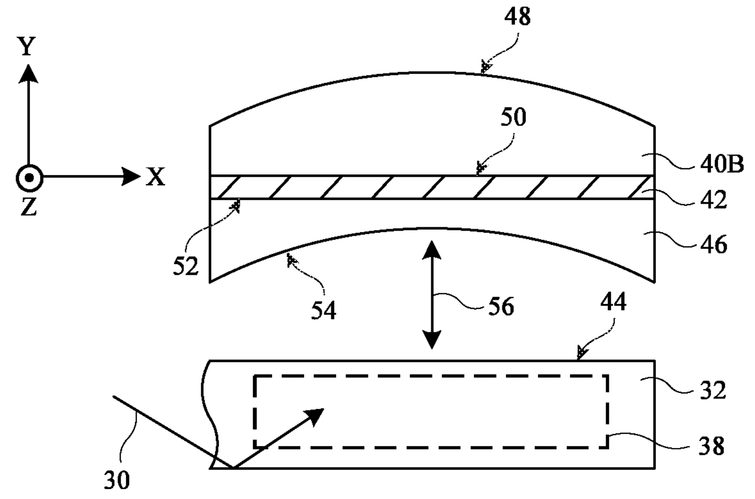
FIGS. 3 and 4 are top views showing how an illustrative planar tint layer may be layered onto a lens overlapping a waveguide in accordance with some embodiments.

FIG. 3 is a diagram showing one example in which tint layer 42 is planar and is disposed on lens 40B. Lens 40B and eye box 24 (FIG. 2) have been omitted from FIGS. 3-15 for the sake of clarity. Lens 40B and tint layer 42 may overlap output coupler 38 on waveguide 32.

As shown in FIG. 3, lens 40B may have a first surface 48 that faces away from waveguide 32 and the eye box (e.g., that faces real-world objects 28 of FIG. 2). Lens 40B may also have a second surface 50 opposite first surface 48 and facing waveguide 32. Surfaces 50 and 48 are optical (transmissive) surfaces of lens 40B and therefore transmit world light from real-world objects 28 (FIG. 2). The optical axis of lens 40B extends through the center of surfaces 48 and 50 (e.g., parallel to the Y-axis).

In general, surface 48 may be planar (flat), may be curved in one dimension (e.g., may be a developable surface that is bent about a single axis and can therefore be flattened into a plane without distortion), may be curved in two dimensions (e.g., may be a non-developable surface that is bent about multiple axes such that the surface cannot be flattened into a plane without distortion), may be spherically curved, may be aspherically curved, may be elliptically curved, may be cylindrically curved, may be toroidally curved, may be convex, may be concave, may be freeform curved, or may exhibit two or more of these curvatures. Similarly, surface 50 may be planar, may be curved in one dimension, may be curved in two dimensions, may be spherically curved, may be aspherically curved, may be elliptically curved, may be cylindrically curved, may be toroidally curved, may be convex, may be concave, may be freeform curved, or may exhibit two or more of these curvatures. Surface 50 may have the same curvature as surface 48 (e.g., surface 50 may extend parallel to surface 48) or may have a different curvature from surface 48 (e.g., surfaces 48 and 50 may be non-parallel). For the sake of illustration, in the example of FIG. 3, surface 48 is convex and surface 50 is planar.

As shown in FIG. 3, tint layer 42 may be layered onto surface 50 of lens 40B. Tint layer 42 may therefore conform to the shape of surface 50 of lens 40B (e.g., tint layer 42 may be planar). If desired, an additional lens such as lens 46 may be disposed on tint layer 42 (e.g., tint layer 42 may be sandwiched or interposed between lens 40B and lens 46). Lens 46 may sometimes be referred to herein as lens element 46. Lens 46 may have a first surface 52 that contacts tint layer 42 and an opposing second surface 54 facing waveguide 32. Waveguide 32 may have a lateral surface 44 facing lens 40B. Lateral surface 44 may, for example, be a planar surface (e.g., extending parallel to surface 50 of lens 40B). Surface 54 of lens 46 may be separated from lateral surface 44 of waveguide 32 by air gap 56.

In general, surface 52 may be planar, may be curved in one dimension, may be curved in two dimensions, may be spherically curved, may be aspherically curved, may be elliptically curved, may be cylindrically curved, may be toroidally curved, may be convex, may be concave, may be freeform curved, or may exhibit two or more of these curvatures. Similarly, surface 54 may be planar, may be curved in one dimension, may be curved in two dimensions, may be spherically curved, may be aspherically curved, may be elliptically curved, may be cylindrically curved, may be toroidally curved, may be convex, may be concave, may be freeform curved, or may exhibit two or more of these curvatures. Surface 52 may have the same curvature as surface 54 (e.g., surface 52 may extend parallel to surface 54) or may have a different curvature from surface 54 (e.g., surfaces 52 and 54 may be non-parallel).

In the example of FIG. 3, surface 52 is planar and surface 54 is convex. During display operations, output coupler 38 redirects most of image light 30 towards eye box 24 (FIG. 2). However, in practice, some of the image light 30 may also be leak upwards towards tint layer 42 (e.g., after interacting with output coupler 38 and/or after reflection off the lateral surface of waveguide 32 opposite to lateral surface 44). This image light may strike tint layer 42 and be reflected by tint layer 42 back towards the eye box (FIG. 2). The portion of the image light that leaks out of waveguide 32 and reflects off tint layer 42 may sometimes be referred to herein as reflected image light whereas the portion of the image light that is coupled out of waveguide 32 and towards the eye box by output coupler 38 may sometimes be referred to herein as primary image light. If care is not taken, the reflected image light can be mis-aligned with respect to the primary image light, producing unsightly ghost image artifacts at eye box 24.

If desired, the curvature of surface 54 of lens 46 may impart optical power to the reflected image light produced by tint layer 42. The optical power may serve to defocus (blur) the reflected light (e.g., virtual images in the reflected image light) at the location of eye box 24, thereby helping to reduce the visibility of ghost image artifacts at eye box 24 (e.g., by placing the reflected light outside of the eye's accommodation range). However, the concave curvature of surface 54 in the example of FIG. 3 may cause the reflected image light to undesirably compete with the primary image light coupled out of waveguide 32 by output coupler 38.

Figure 4:
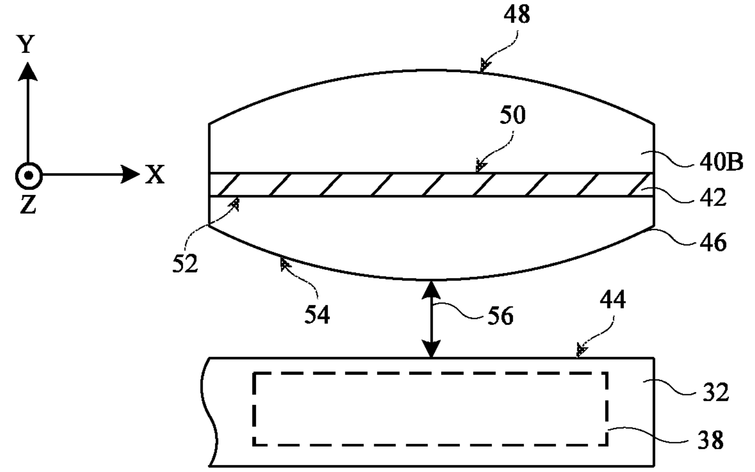

To mitigate these issues, surface 54 may be provided with a convex curvature as shown in the example of FIG. 4. When surface 54 is provided with a convex curvature, lens 46 may impart optical power to the reflected image light without causing the reflected image light to compete with the primary image light at eye box 24.

Figure 5:
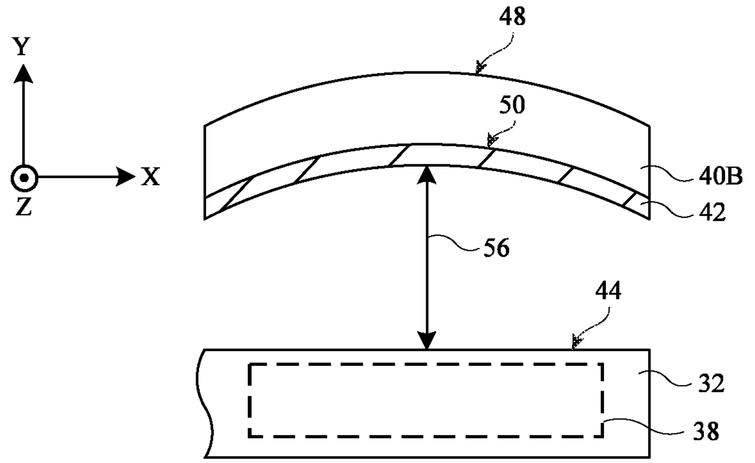
FIG. 5 is a top view showing how an illustrative curved tint layer may be layered onto an inner surface of a lens overlapping a waveguide in accordance with some embodiments.

In the examples of FIGS. 3 and 4, optical power is imparted to the reflected image light by lens 46 and tint layer 42 is planar. If desired, tint layer 42 may be curved to impart the reflected image light with optical power without the use of lens 46. FIG. 5 is a diagram showing one example of how tint layer 42 may be curved to impart the reflected image light with optical power without the use of lens 46.

As shown in FIG. 5, surface 50 of lens 40B may be curved and tint layer 42 may be disposed on surface 50, thereby imparting tint layer 42 with the underlying curvature of surface 50. The curvature of surface 50 and thus tint layer 42 may be selected to impart the reflected image light with the desired optical power to blur images in the image light reflected off tint layer 42 without causing the reflected image light to compete with the primary image light coupled out of waveguide 32 by output coupler 38.

Figure 6:
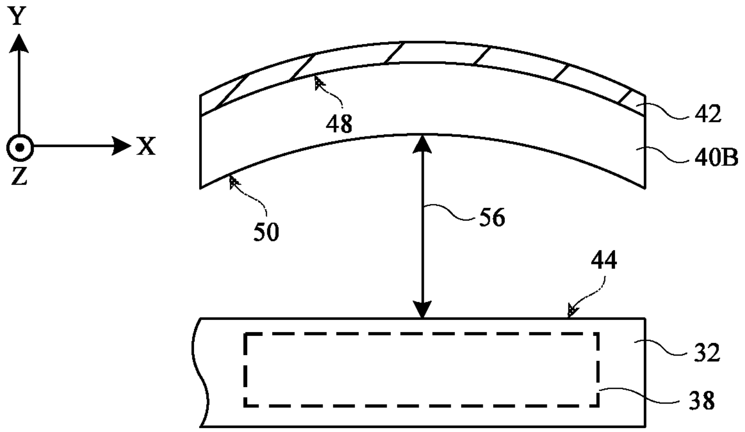
FIG. 6 is a top view showing how an illustrative curved tint layer may be layered onto an outer surface of a lens overlapping a waveguide in accordance with some embodiments.

The example of FIG. 5 in which tint layer 42 is disposed on surface 50 of lens 40B is illustrative and non-limiting. If desired, tint layer 42 may be disposed on surface 48 of lens 40B, as shown in the example of FIG. 6. As shown in FIG. 6, the curvature of surface 48 and thus tint layer 42 may be selected to impart the reflected image light (e.g., upon reflection off tint layer 42) with the desired optical power to defocus the reflected image light without causing the reflected image light to compete with the primary image light at eye box 24.

The curvature of tint layer 42 (FIGS. 5 and 6) or surface 54 (FIG. 4) may, for example, have a radius of curvature of 50-250 mm, 60-510 mm, 110-550 mm, 100-200 mm, 150-510 mm, 300-600 mm, 410-510 mm, more than 10 mm, more than 100 mm, more than 200 mm, more than 300 mm, more than 400 mm, more than 500 mm, less than 500 mm, less than 400 mm, less than 200 mm, less than 100 mm, or other values. The radius of curvature may, for example, depend on the reflectivity of tint layer 42 (e.g., 0.1-3%, 0.2-4%, or other values). Curving tint layer 42 may, for example, serve to reduce the volume and weight of optical system 22 (e.g., by allowing lens 46 to be omitted) and may cause the reflected image light to become even more defocused than in implementations where lens 46 is used to defocus the reflected image light.

Figure 7:
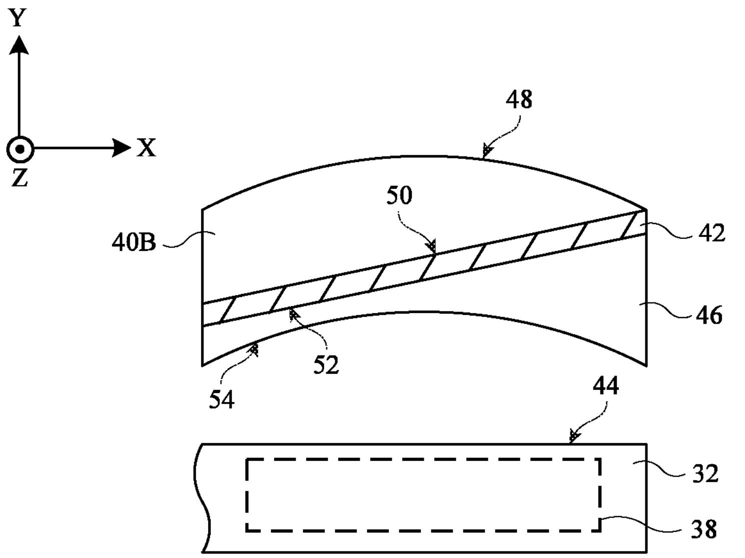
FIG. 7 is a top view showing how an illustrative tilted planar tint layer may be layered onto a lens overlapping a waveguide in accordance with some embodiments.

If desired, tint layer 42 may be planar and may be tilted at a non-parallel angle with respect to lateral surface 44 of waveguide 32. FIG. 7 is a diagram showing one example of how tint layer 42 may be planar and may be tilted at a non-parallel angle with respect to lateral surface 44 of waveguide 32.

As shown in FIG. 7, surface 50 of lens 40B may be planar and may be tilted at a non-parallel angle with respect to lateral surface 44 of waveguide 32. Tint layer 42 may be disposed on surface 50 and may thereby also be planar and tilted at the non-parallel angle with respect to lateral surface 44 of waveguide 32. If desired, tint layer 42 may be sandwiched between lens 40B and lens 46 (e.g., surface 52 may be planar and tilted to conform to tint layer 42 and surface 50 of lens 40B) or lens 46 may be omitted. Tilting tint layer 42 in this way may configure tint layer 42 to reflect image light that leaks out of waveguide 32 towards lens 40B at an angle that is pointed away from the eye box, thereby preventing the reflected image light from being visible within the eye box. The tilted tint layer may be tilted at a non-parallel angle with respect to lateral surface 44 and may be embedded in one or more other optical elements (e.g., lenses 40B and 46 in the example of FIG. 7). In other implementations, the tilted tint layer may be free standing and not in contact with any other optical element. For example, tint layer 42 may be tilted and separated from lens 40B and/or lens 46 by air gaps (e.g., lens 46 may also be omitted).

Figure 8:
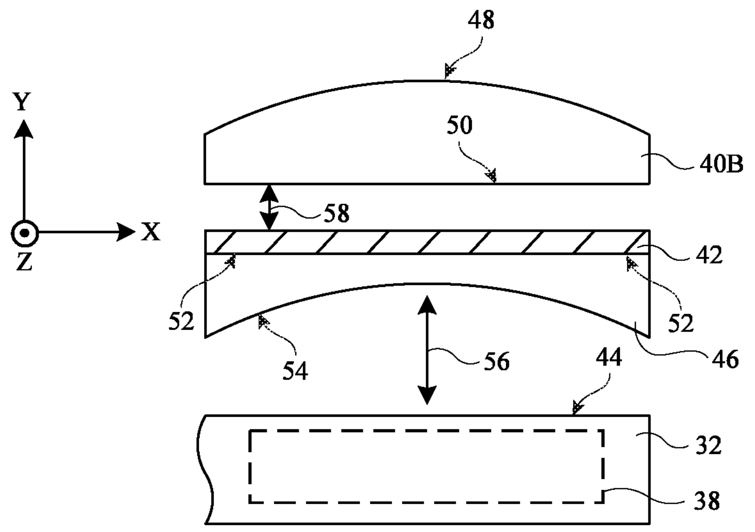
FIG. 8 is a top view showing how an illustrative planar tint layer may be separated by an air gap from a lens overlapping a waveguide in accordance with some embodiments.

The examples of FIGS. 3-7 in which tint layer 42 is disposed on lens 40B are illustrative and non-limiting. If desired, tint layer 42 may be separated from lens 40B by an air gap. FIG. 8 is a diagram showing one example of how tint layer 42 may be separated from lens 40B by an air gap.

As shown in FIG. 8, tint layer 42 may be disposed within optical system 22 between lens 40B and waveguide 32. Tint layer 42 may be separated from surface 50 of lens 40B (e.g., a planar surface or a surface having another shape) by air gap 58. In the example of FIG. 8, tint layer 42 is planar and layered onto surface 52 of lens 46 (e.g., lens 46 may form a substrate for tint layer 42), which is separated from waveguide 32 by air gap 56. Lens 46 may be formed from plastic, for example. Lens 46 may serve to defocus the reflected image light from tint layer 42.

Figure 9:
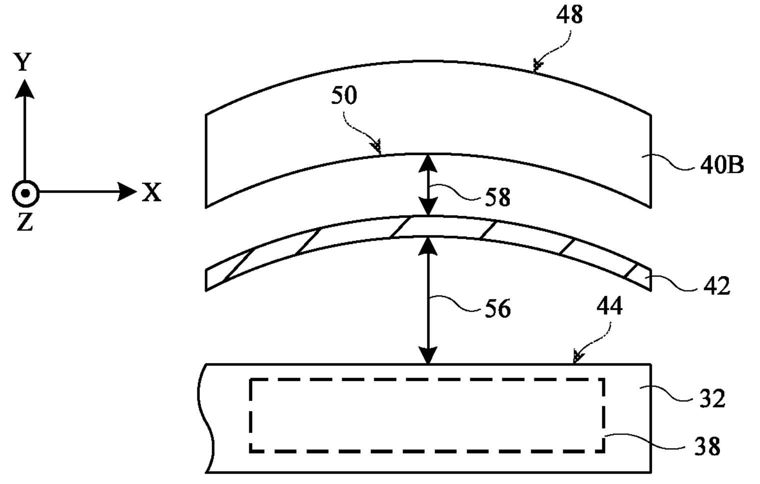
FIG. 9 is a top view showing how an illustrative curved tint layer may be separated by an air gap from a lens overlapping a waveguide in accordance with some embodiments.

The example of FIG. 8 in which tint layer 42 is planar and layered onto lens 46 is illustrative and non-limiting. If desired, tint layer 42 may be free-standing and curved, as shown in the example of FIG. 9. As shown in FIG. 9, tint layer 42 may be separated from surface 50 of lens 40B (e.g., a curved surface or a surface having another shape) by air gap 58 and may be separated from lateral surface 44 of waveguide 32 by air gap 56.

Tint layer 42 may, for example, be curved in one dimension (e.g., may have a one-dimensional curvature), may be curved in two dimensions (e.g., may have a two-dimensional curvature), may be spherically curved (e.g., may have a spherical curvature), may be aspherically curved (e.g., may have an aspheric curvature), may be elliptically curved (e.g., may have an elliptical curvature), may be cylindrically curved (e.g., may have an elliptical curvature), may be toroidally curved (e.g., may have a toroidal curvature), may be freeform curved (e.g., may have a freeform curvature), or may exhibit two or more of these curvatures. The curvature of tint layer 42 may be selected to impart the reflected image light with the desired optical power to defocus the reflected image light without causing the reflected image light to compete with the primary image light at the eye box (e.g., tint layer 42 of FIG. 9 may have the same curvature as surface 50 of FIG. 5 or surface 48 of FIG. 6). In another implementation, lens 40B may be interposed between tint layer 42 and waveguide 32 (e.g., tint layer 42 may be separated from surface 48 of lens 40B by an air gap). In the examples of FIGS. 3-9, the curvature(s) of lens 40A (FIG. 2) and/or lens 40B may be selected to also reverse any of the optical power imparted to world light transmitted through tint layer 42 and lens 40B for the purpose of defocusing the reflected image light.

Figure 10:
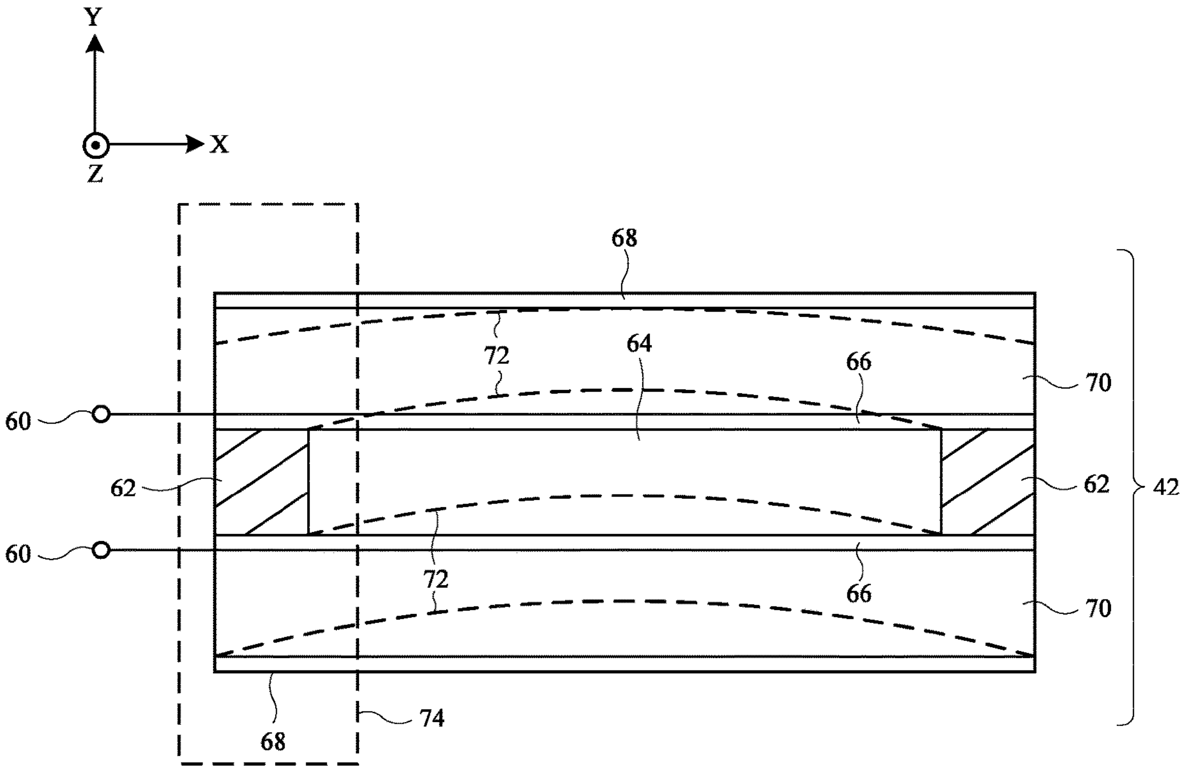
FIG. 10 is a top view of an illustrative tint layer having a pair of glass substrates in accordance with some embodiments.

FIG. 10 is a cross-sectional top view of an illustrative tint layer 42. As shown in FIG. 10, tint layer 42 may include first and second substrate layers such as substrates 70. Substrates 70 may include glass (e.g., substrates 70 may be glass layers), polymer (e.g., plastic), or other transparent materials. Tint material 64 may be formed in a layer between substrates 70 (e.g., disposed within a cavity between the lateral surfaces of substrates 70). A peripheral ring of adhesive such as peripheral seal 62 may be used to contain tint material 64 while spacing substrates 70 apart from each other. Tint material 64 may be formed from electrochromic (EC) material (organic or inorganic materials) such as an EC gel, guest-host liquid crystal material, and/or other electrically adjustable tint material.

As shown in FIG. 10, tint layer 42 may have a first and second transparent conductive layers 66 (e.g., layers of indium tin oxide or other transparent conductive coating material) on opposing sides of tint material 64 (e.g., on the interior lateral surfaces of substrates 70). Terminals 60 may receive control voltages from control circuitry 16 (FIG. 1). By adjusting the voltage across terminals 60, the electric field applied by electrodes 66 to tint material 64 may be adjusted, thereby adjusting the amount of light transmission exhibited by tint material 64 and thus tint layer 42. In an illustrative configuration, tint layer 42 may exhibit a variable amount of light transmission ranging continuously between a minimum level of TMIN and a maximum level of TMAX. The value of TMIN may be 5%, 10%, 15%, 20%, 2-15%, 3-25%, 5-40%, 10-30%, 10-25%, at least 3%, at least 6%, at least 15%, at least 20%, less than 35%, less than 25%, less than 15%, or other suitable minimum level sufficient to help reduce environmental (real-world) light during viewing of computer-generated images from projectors 26 in bright environmental lighting conditions. The value of TMAX may be at least 50%, at least 60%, 60-99%, 40-99.9%, 80-99%, 70-99%, 80-97%, at least 70%, at least 80%, at least 85%, at least 90%, at least 95%, less than 99.99%, less than 99%, or other suitable maximum level sufficiently transparent to allow a viewer to comfortably view real world objects through tint layer 42 during situations where projectors 26 are not supplying images or other situations where higher transmission levels are desirable.

If desired, anti-reflective coatings (ARCs) such as anti-reflective coatings 68 may be disposed on one or both of the lateral surfaces of substrates 70 opposite tint material 64. In implementations where tint layer 42 is curved (see, e.g., FIGS. 5, 6, and 9), substrates 70 may be curved (e.g., the lateral surfaces of substrates 70 may be curved), as shown by curves 72. For example, a hot press and annealing process may be used to bend the glass used to form substrates 70. The bent (curved) glass may then be coated with electrodes 66 and anti-reflective coatings 68. Terminals 60 may then be coupled to electrodes 66 (e.g., by ACF bonding conductive material on a flexible printed circuit to electrodes 66). Peripheral seal 62 (e.g., a ring of epoxy) may then be deposited on one of the substrates 70, defining a cavity that is laterally surrounded by peripheral seal 62. The cavity may then be filled with tint material 64 and the other substrate 70 may be bonded to peripheral seal 62, thereby sealing tint material 64 between substrates 70.

Figure 11:
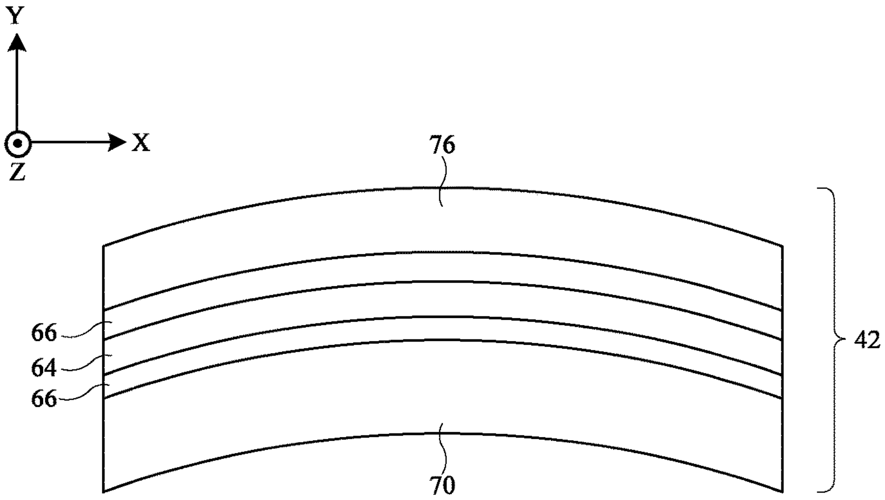
FIG. 11 is a top view of an illustrative tint layer having a single glass substrate in accordance with some embodiments.

In other implementations, substrates 70 may be formed from plastic that is molded or bent into a curved shape or tint layer 42 may be formed between two curved molded plastic substrates. The example of FIG. 10 in which tint layer 42 includes two substrates 70 is illustrative and non-limiting. If desired, tint layer 42 may include only a single glass or plastic substrate 70, as shown in the example of FIG. 11. As shown in FIG. 11, electrodes 66 and tint material 64 may be deposited onto a curved surface of glass substrate 70 (e.g., using a physical vapor deposition (PVD) process, wet coating, etc.). If desired, an encapsulation layer 76 may be deposited over electrodes 66 and tint material 64. Other processes may be used to form curved tint layer 42 if desired.

Figure 12:
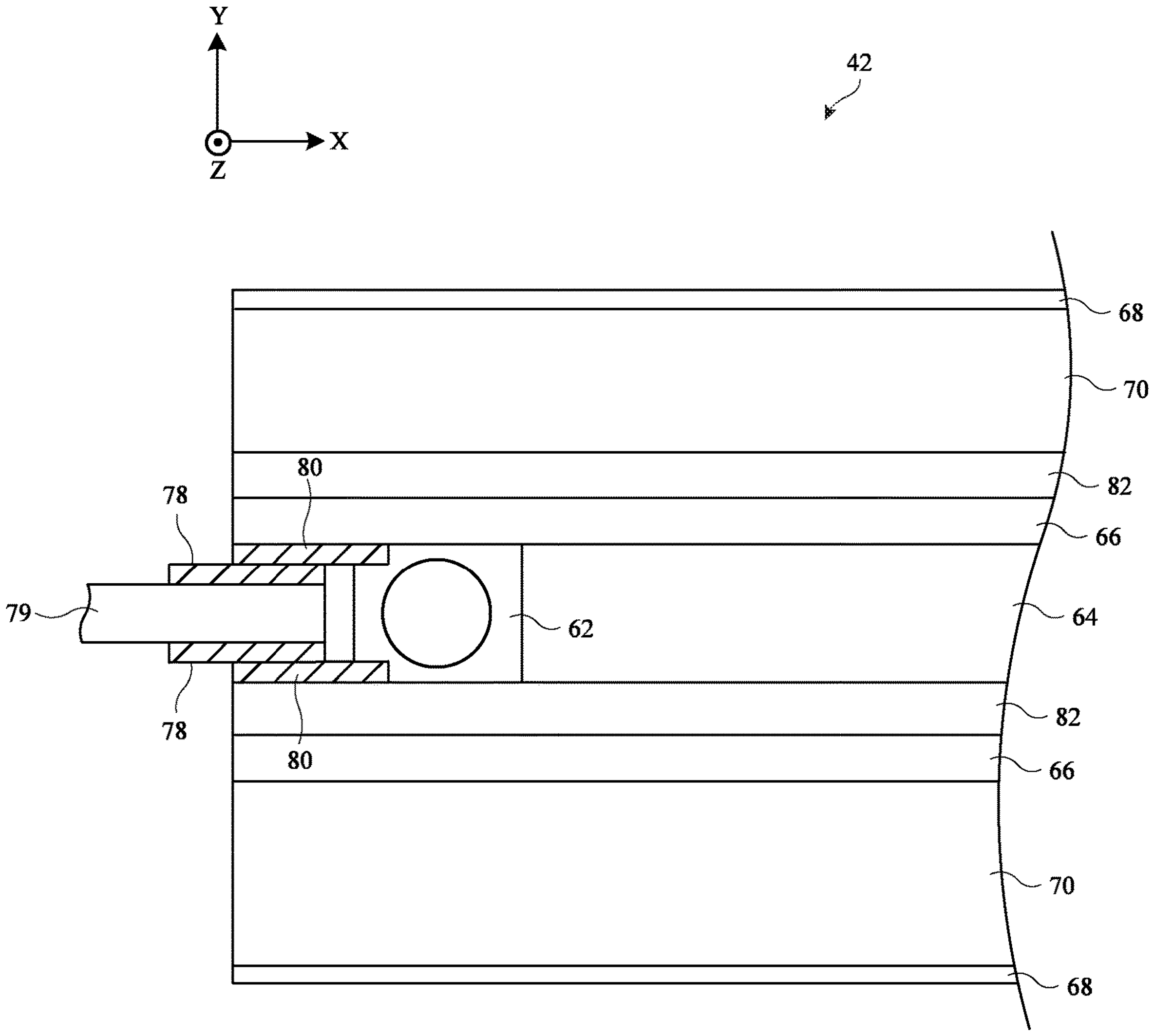
FIG. 12 is a top view showing how an illustrative tint layer may be provided with electrical signals to dynamically adjust the amount of light transmitted by the tint layer in accordance with some embodiments.

FIG. 12 is an exploded cross-sectional top view of edge region 74 of tint layer 42 (FIG. 10). As shown in FIG. 12, tint layer 42 may include index matching layers 82 between electrodes 66 and substrates 70. A flexible printed circuit 79 may be used to feed control signals (voltages) to electrodes 66. Contact pads 80 (e.g., metal ring pads) may be disposed on electrodes 66 and may electrically couple electrodes 66 to conductive material 78 on flexible printed circuit 79, thereby forming terminals 60 (FIG. 10).

In general, the reflectance of tint layer 42 is produced by the various interfaces of tint layer 42. The reflectance of these interfaces may be reduced to reduce the reflectivity of tint layer 42 and thus the amount of reflected image light directed back towards the eye box (e.g., minimizing the production of ghost image artifacts at the eye box). For example, anti-reflective coatings 68 may be configured to minimize reflection at the interface between substrates 70 and air. Additionally or alternatively, index matching layers 82 may be selected to effectively match the refractive index of electrode layers 66 (e.g., ITO) to the refractive index of substrates 70 (e.g., glass), thereby forming a smooth refractive index transition that minimizes reflection of image light. Index matching layers 82 may, for example, be multi-layer stacks of thin-films (e.g., thin-film interference filters) having refractive indices and/or thicknesses that are selected to produce optical reflections and transmissions that cause electrodes 66 and substrates 70 to exhibit the same effective refractive index. Additionally or alternatively, index matching layers 82 may be selected to effectively match the refractive index of electrode layers 66 to the refractive index of tint material 64.

The examples of FIGS. 3-9 in which curved optical surfaces are used to defocus reflected light (e.g., for mitigating ghost image artifacts at the eye box) are illustrative and non-limiting. If desired, tint layer 42 and waveguide 32 may be configured to align the primary image light coupled out of waveguide 32 by output coupler 38 with the reflected image light from tint layer 42. Such alignment will also prevent the formation of visible ghost image artifacts at the eye box.

Tint layer 42 and waveguide 32 may be configured to align the primary image light with the reflected image light by maximizing the parallelism between the lateral surfaces of tint layer 42 and the lateral surfaces of waveguide 32. In practice, non-parallelism can have many sources, such as imperfect waveguide flatness, imperfect tint layer flatness, imperfect tint cell gap uniformity, and a non-parallel orientation of the tint layer relative to the waveguide. Tint layer non-flatness can, for example, be produced by stress imbalances in glass treatments or glass coatings (e.g., chemical strengthening, the anti-reflective coatings, electrode coatings, etc.) and/or from stress imbalances in the cell assembly process (e.g., carrier tape delamination, epoxy stress such as curing shrinkage, CTE mismatch with glass, and seal width uniformity, EC gel vacuum filing stress, UV plug injection pressure, and flexible printed circuit thickness).

Figure 13:
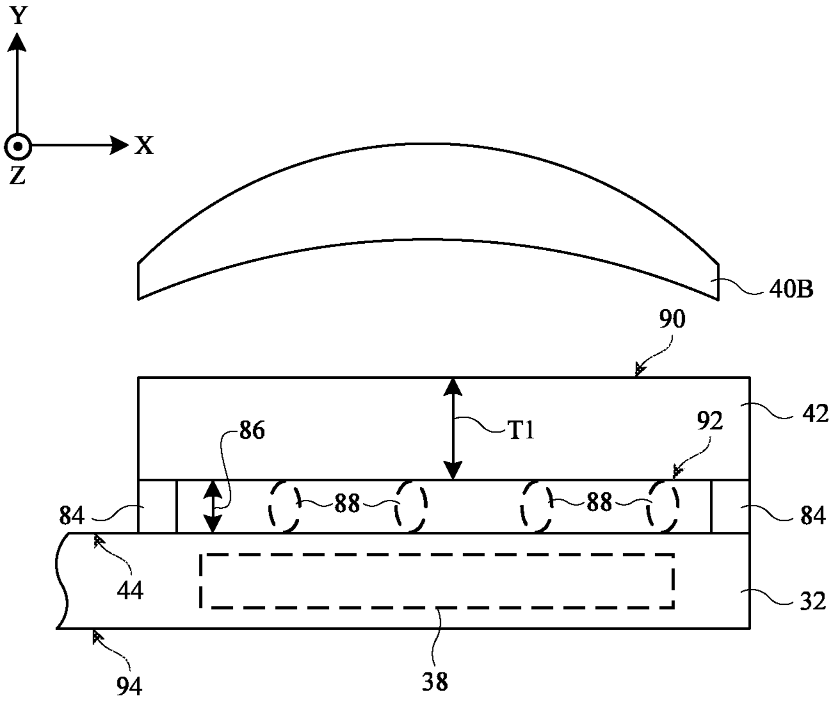
FIG. 13 is a top view showing how an illustrative planar tint layer may be provided with an increased thickness and/or spacers between the tint layer and a waveguide to maximize parallelism between the tint layer and the waveguide in accordance with some embodiments.

To mitigate these issues and maximize the parallelism between the lateral surfaces of tint layer 42 and the lateral surfaces of waveguide 32, the thickness of the substrates 70 in tint layer 42 may be increased, additional spacers may be disposed between tint layer 42 and waveguide 32, and/or additional spacers may be disposed within tint layer 42. FIG. 13 is a diagram showing how the parallelism between the lateral surfaces of tint layer 42 and the lateral surfaces of waveguide 32 may be maximized by increasing the thickness of substrates 70 in tint layer 42 and/or by disposing additional spacers between tint layer 42 and waveguide 32. The electrodes, index matching layers, and anti-reflective coatings of FIG. 12 have been omitted from FIGS. 13 and 14 for the sake of clarity.

As shown in FIG. 13, tint layer 42 may have a thickness T1 as measured from lateral surface 90 to lateral surface 92. Lateral surfaces 90 and 92 may be planar. In general, greater thicknesses T1 may allow tint layer 42 to be more uniformly flat across its lateral area than lesser thicknesses T1. Tint layer 42 may, for example, be provided with substrates 70 having a relatively large thickness that configures tint layer 42 itself to exhibit a relatively large thickness (e.g., to within 50-150% of the thickness of waveguide 32).

If desired, tint layer 42 may be separated from lateral surface 44 of waveguide 32 by air gap 86. Tint layer 42 may be mounted to lateral surface 44 of waveguide 32 using a peripheral ring of adhesive such as peripheral seal 84 (or using any other desired spacers at the edge or along the lateral periphery of tint layer 42). A set of one or more additional spacers 88 (e.g., epoxy beads) may be disposed within air gap 86 between lateral surface 92 (e.g., at uniform/regular intervals or other intervals across the lateral surface area of lateral surfaces 92 and 44). Spacers 88 may help to ensure that air gap 86 exhibits a uniform width across lateral surfaces 92 and 44, thereby helping to reenforce the flatness of tint layer 42 across its lateral area and thus maximizing parallelism between lateral surfaces 90 and 92 of tint layer 42 and lateral surfaces 44 and 94 of waveguide 32. This increased level of parallelism may, for example, serve to align the reflected image light with the primary image light thereby preventing the formation of visible ghost image artifacts.

Figure 14:
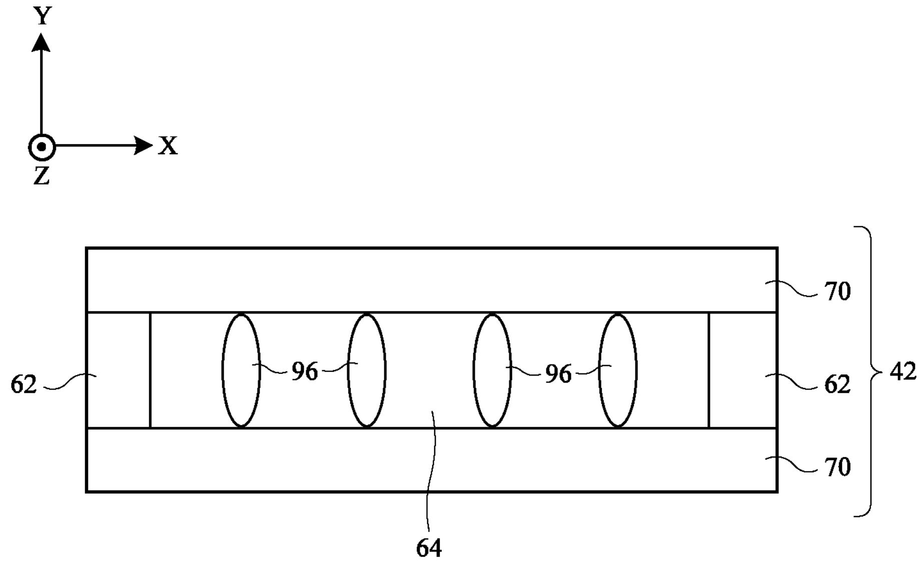
FIG. 14 is a top view showing how an illustrative planar tint layer may be provided with spacers between glass substrates to maximize parallelism within the tint layer in accordance with some embodiments.

Additionally or alternatively, tint layer 42 may itself include additional spacers for maximizing parallelism, as shown in the example of FIG. 14. As shown in FIG. 14, a set of one or more additional spacers 96 (e.g., epoxy beads) may be disposed within the cavity of tint layer 42 between substrates 70 (e.g., within tint material 64, which may be filled within the cavity after placement of spacers 96). Spacers 96 may be placed at regular/uniform intervals or at other intervals across the lateral area of substrates 70. Peripheral seal 62 may laterally surround spacers 96. Spacers 96 may help to ensure that tint material 64 exhibits a uniform thickness across the lateral area of substrates 70, thereby helping to reenforce the flatness of tint layer 42 (e.g., cell gap uniformity) across its lateral area and thus maximizing parallelism between lateral surfaces 90 and 92, and thus between tint layer 42 and lateral surfaces 44 and 94 of waveguide 32. This increased level of parallelism may, for example, serve to align the reflected image light with the primary image light thereby preventing the formation of visible ghost image artifacts. If desired, spacers 96 may be sufficiently small so as not to be visible or resolvable to the human eye when located at eye box 24 (FIG. 2).

Figure 15:
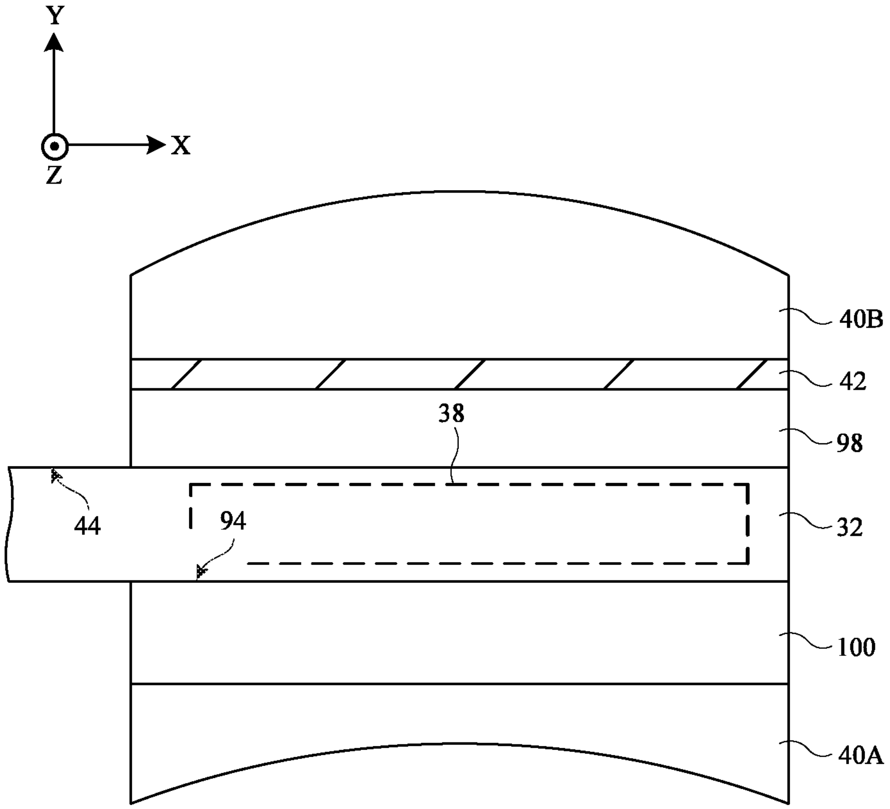
FIG. 15 is a top view showing how a low refractive index coating may fill air gaps between lenses and a waveguide in accordance with some embodiments.

If desired, low-index materials can be used to fill one or more of the air gaps described herein. In the example of FIG. 15, a layer of low-index material 98 fills an air gap between tint layer 42 on the inner surface of lens 40B and lateral surface 44 of waveguide 32 (e.g., low-index material 98 contacts both tint layer 42 and waveguide 32).

A layer of low-index material 100 may fill an air gap between waveguide 32 and lens 40A. The refractive index of low index materials 98 and 100 may be as close to the refractive index of air as possible (e.g., around n=1.0-1.5).

The foregoing is merely illustrative and various modifications can be made to the described embodiments. The foregoing embodiments may be implemented individually or in any combination.

What is claimed is:

1. An electronic device comprising:
- a waveguide configured to propagate first light;
- a first lens having a first surface facing the waveguide;
- a second lens, the waveguide being interposed between the first lens and the second lens;
- an optical coupler on the waveguide, wherein the optical coupler is configured to direct the first light out of the waveguide and through the second lens and wherein the first lens is configured to direct second light through the optical coupler and the second lens;
- a tint layer on the first surface of the first lens; and
- a third lens having a second surface on the tint layer and a third surface facing the waveguide, wherein the third lens is configured to transmit the second light to the optical coupler and wherein the third surface is convex.

2. The electronic device of claim 1, wherein the tint layer is electrically adjustable.

3. The electronic device of claim 1, wherein the first surface, the tint layer, and the second surface are planar.

4. The electronic device of claim 3, wherein the third surface is separated from the waveguide by an air gap.

5. The electronic device of claim 3, wherein the third surface has a freeform curvature,.

6. The electronic device of claim 1, wherein the third surface has a spherical curvature.

7. The electronic device of claim 1, wherein the third surface has an aspherical curvature.

8. The electronic device of claim 1, wherein the third surface has a one-dimensional curvature.

9. The electronic device of claim 1, wherein the third surface has a two-dimensional curvature.

10. The electronic device of claim 1, wherein the first lens has a fourth surface with convex curvature.

11. The electronic device of claim 1, wherein the tint layer comprises:
- a substrate having a fourth surface,
- a first electrode on the fourth surface,
- tint material on the first electrode,
- a second electrode on the tint material, and
- an encapsulation layer on the second electrode.

12. The electronic device of claim 1, wherein the tint layer comprises:
- first and second substrates;
- electrochromic material interposed between the first and second substrates; and
- a ring of epoxy that surrounds the electrochromic gel.

13. An electronic device comprising:
- a waveguide configured to propagate first light;
- a first lens;
- a second lens, the waveguide being interposed between the first lens and the second lens;
- an optical coupler on the waveguide, wherein the optical coupler is configured to direct the first light out of the waveguide and through the second lens and wherein the first lens is configured to direct second light through the optical coupler and the second lens;

a third lens disposed between the first lens and the waveguide and configured to transmit the second light, wherein the third lens has a planar surface facing the first lens and a curved surface facing the waveguide;

a tint layer on the planar surface of the third lens; and an air gap between the tint layer and the first lens.

14. The electronic device of claim 13, wherein the tint layer is electrically adjustable.

15. The electronic device of claim 13, further comprising:

an additional air gap between the curved surface of the third lens and the waveguide.

16. The electronic device of claim 13, wherein the curved surface of the third lens has a freeform curvature, a spherical curvature, an aspherical curvature, a one-dimensional curvature, or a two-dimensional curvature.

17. The electronic device of claim 13, wherein the tint layer comprises:

a first substrate having a first surface and a second surface opposite the first surface, a first anti-reflection coating on the first surface, a first index-matching layer on the second surface, and a first electrode on the first index-matching layer.

18. The electronic device of claim 17, wherein the tint layer further comprises:

a second substrate having a sixth surface and a seventh surface opposite the sixth surface, a second anti-reflection coating on the seventh surface, a second index-matching layer on the sixth surface, a second electrode on the second index-matching layer, and an electrochromic gel between the first and second electrodes.

19. The electronic device of claim 13, wherein the tint layer comprises:

a first substrate;

a second substrate;

a cavity between the first and second substrates;

a peripheral seal that couples the first substrate to the second substrate around the cavity; and an electrochromic gel disposed within the cavity.

20. The electronic device of claim 13, further comprising:

a layer of material that contacts a fourth surface of the waveguide and a fifth surface of the second lens.

21. The electronic device of claim 20, wherein the layer of material has a refractive index between 1.0 and 1.5.

22. The electronic device of claim 13, wherein the waveguide has an additional first planar surface and an additional second planar surface parallel to the additional first planar surface and wherein the planar surface of the third lens is tilted at a non-parallel angle with respect to the additional first planar surface.

23. The electronic device of claim 13, wherein the curved surface has concave curvature.

24. The electronic device of claim 13, wherein the first lens has a surface with convex curvature.

* * * * *